Patented Aug. 10, 1926.

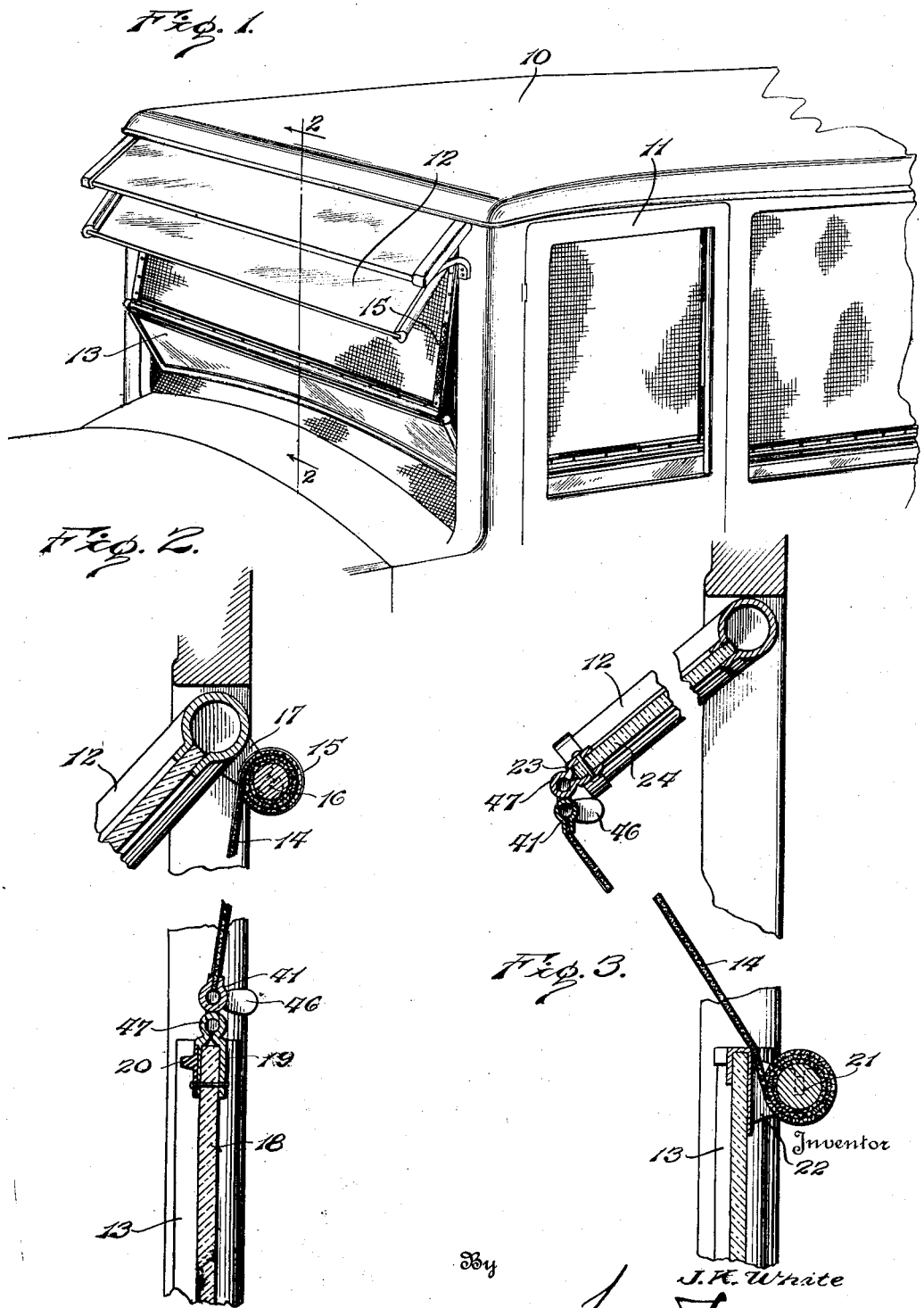

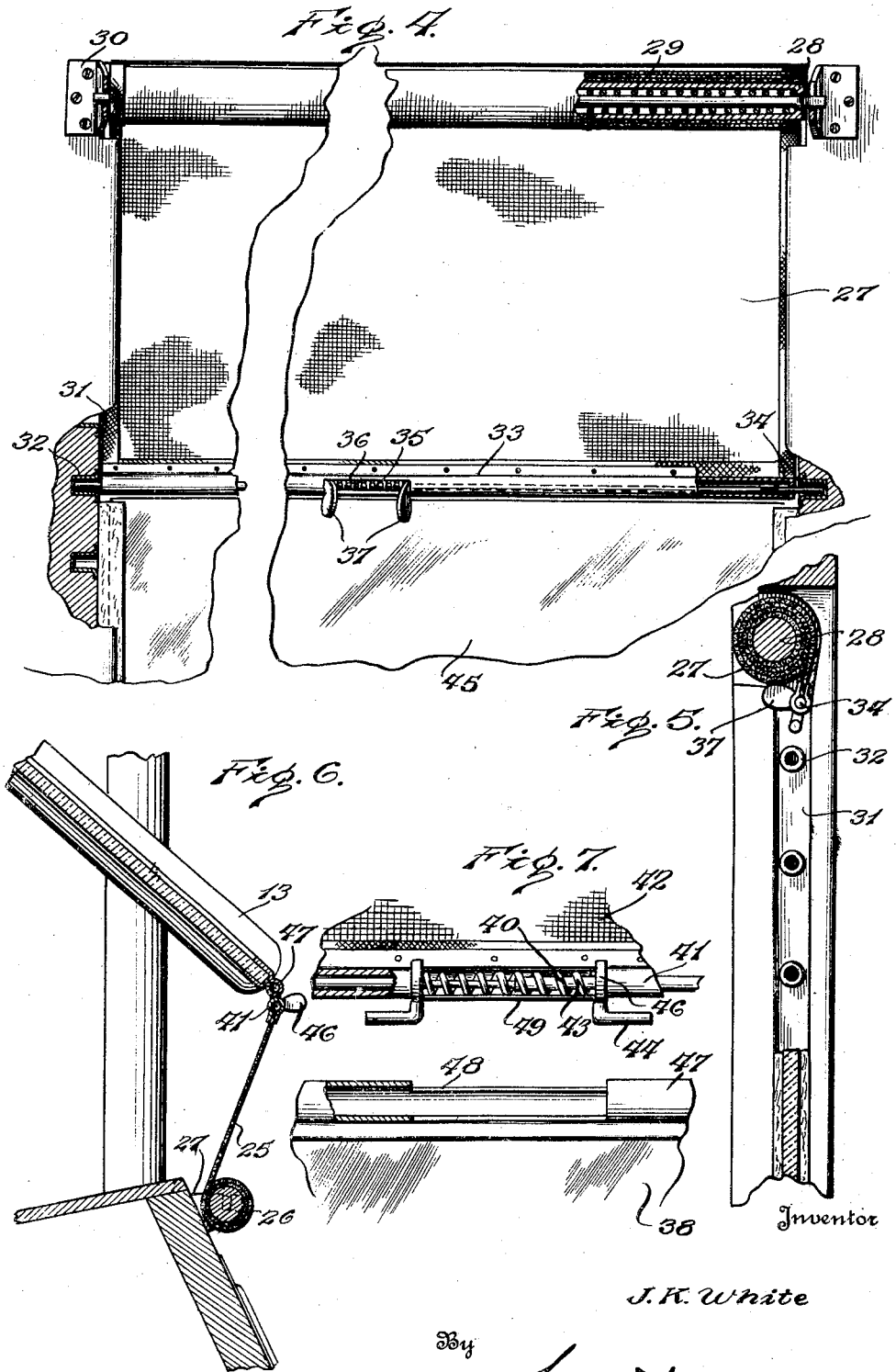

1,595,274

UNITED STATES PATENT OFFICE.

JOEL KIRK WHITE, OF LA CROSSE, WISCONSIN.

WINDOW SCREEN FOR AUTOMOBILES.

Application filed August 18, 1923. Serial No. 658,119.

My invention relates to screens adapted to be used on automobiles and more particularly automobiles of the closed kind, such as sedans, coupés and limousines.

When riding in a closed automobile during the warm season, it is always desirable to leave the windows open, but when passing through regions infested by mosquitos, bees, flies, or other insects, this is practically impossible as large swarms of the insects are sure to enter the automobile and annoy the passengers. A great many people sleep in their cars while camping out or on a trip, and for these reasons the present invention aims at screening all of the window openings when the windows are down to prevent insects from entering the car.

Another advantage of thus screening the window openings resides in the fact that a great deal of dust from the road will be excluded thereby making traveling more comfortable.

In the accompanying drawings,

Figure 1 is a fragmentary perspective view of a closed automobile provided with window screens forming the subject matter of the present invention;

Figure 2 is a fragmentary section of the upper windshield in larger scale, and with the screen in position;

Figure 3 is a similar view with the screen attached in a different manner;

Figure 4 is a front elevation of one of the side windows of the automobile as seen from the inside thereof, with the screen in position, some parts being in section;

Figure 5 is a fragmentary side elevation and section of the window frame indicating the mode of adjustment of the screen;

Figure 6 is a view similar to Figure 2, showing a screen for the lower windshield; and Figure 7 shows a fragmentary sectional elevation of means for attaching the free edge of the screen to a relatively movable member.

In the drawings, reference numeral 10 represents a closed automobile having side windows 11, upper windshield 12, and lower windshield 13, the side windows being adapted to slide up and down in the usual manner for closing and opening the same, while the windshields are hinged to swing outwardly in the usual manner.

Considering, first, Figures 1 and 2, the screen 14 consists preferably of wire netting with reinforced edges as at 15 made of some suitable fabric, one end of the netting being attached to an ordinary shade roller 16. This shade roller is mounted on suitable brackets 17 on the inner side of the windshield 12 and at the upper end thereof, as indicated in Figure 2. The roller 16 is provided with winding springs tending to roll up the screen upon the roller. Along the upper edge of the glass pane 18 of the lower windshield 13 is attached a metal or rubber shoe 19 to which the bottom edge of the screen 14 is adapted to be secured. This shoe may have a forwardly projecting ledge 20 for closing the joint between the upper and lower windshields.

Instead of mounting the screen roller 16, as shown in Figure 2, the screen roller 21 may be mounted in brackets 22 at the upper end of the lower windshield 13 and on the inside thereof, as indicated in Figure 3. In this case the edge of the loose end of the screen is attached, as before, to a shoe 23 secured to the lower edge of the window pane 24 of the upper windshield 12.

In Figure 6 is shown a screen 25, also carried on a shade roller 26 in brackets 27 mounted on the dashboard of the automobile, while the loose edge of the screen 25 is, as before, attached to the bottom edge of the lower windshield 13.

In Figure 4 is indicated the mode of attachment of a straight up and down running screen 27 for the side windows of the automobile. This screen is normally wound up on the shade roller 28 actuated by coil springs 29, and the shade roller is carried in brackets 30 in the usual manner, which are mounted in the window frame. The sides of the window frame are usually grooved, as at 31, and in the bottom of the grooves are inserted metal thimbles 32 spaced sufficiently apart and arranged in pairs, that is to say, one thimble in one side of the window frame is positioned exactly opposite another thimble on the other side of the window frame, see Figures 4 and 5, and the roller positioned so that the screen follows the grooves when unrolled.

The screen in this case is entirely independent of the window 45, and the free edge of the screen 27 is provided with a metallic sleeve 33 in which are housed a pair of sliding rods 34 pressed outwardly by a compressing spring 35. Through a slit 36 in the sleeve 33, project a pair of ears 37 furnished on the inner ends of the rods 34, by means of which the rods 34 may be withdrawn inwardly to disengage from the thimbles 32 in which they are made to enter to hold the screen in closed position.

In Figure 7 is shown a different arrangement for holding the screen in position, and the window pane 38 is, for this purpose, provided along its upper edge with a U-shaped or tubular shoe 47 preferably of metal and cemented, riveted or bolted to the pane and to which the window screen 42 may be attached by hooks 44 at the inner ends of sliding rods 40 similar to those shown in Figure 4 and mounted in the sleeve 41 at the lower edge of the screen. The hooks 44 project downwardly through a central slit 49 in the sleeve 41 and are pushed apart by a spring 43. The window 38 has its edge reinforced by the tubular shoe 47 which is provided with a slit 48 to admit the hooks 44 into engagement with the bore of the shoe so that when the window 38 is lowered, the screen will be lowered with it. The screen is disengaged from the window by pressing together the ears 46 thereby withdrawing the hooks 44 from the tubular shoe 47. Figures 2, 3 and 6 show that the same arrangement is utilized for connecting the free edge of the screen with a relatively movable member of the windshield.

The width of the screen corresponds to that of the window opening in the case of screens for the windshields, but in the case of sliding instead of swinging windows, as indicated in Figures 4 and 5, the screen is wide enough to engage with its reinforced side edges in the grooves 31 of the window frame.

It will be evident from the drawings that when the loose end of the screen is attached to the windshield, whether the upper or lower one, the screen is automatically unrolled when the windshield is swung into open position, and when the windshield is closed the screen will be automatically wound up on its roller. Similarly, when the loose end of the screen is attached to the adjacent edge of a sliding window, the screen will go up and down with the latter and need no separate handling.

Having thus described the invention, what is claimed as new is:

1. In a structure of the character described, a frame, upper and lower closures movably mounted in said frame, a roller carried by one closure, a curtain wound upon said roller, a shoe secured upon the adjacent edge portion of the second closure and including a tubular pocket extending longitudinally of the closure and formed with a longitudinally extending slot intermediate its length, a tubular sleeve secured upon the free end portion of said curtain and formed with a longitudinally extending opening intermediate its length, rods slidable in said sleeve, ears extending from said rods through said opening, hooks extending from said rods through said opening and having their outer end portions extending away from each other longitudinally of the sleeve and pocket for hooking engagement with the pocket when projected into the same through its slot, and spring means normally urging said rods away from each other with said hooks positioned for hooking engagement with said pocket.

2. In a structure of the character described, a frame, a closure movably mounted in said frame, a rotatably mounted roller, a curtain wound upon said roller, a shoe secured to one edge portion of said closure and including a tubular pocket extending longitudinally thereof and formed with a longitudinally extending slot intermediate its length, a sleeve secured along the free end of said curtain and having a longitudinally extending opening intermediate its length, rods slidable longitudinally in said sleeve, hooks extending from said rods through said opening and having their outer end portions extending away from each other for hooking engagement with the pocket when projected into the same through its slot, resilient means urging said rods away from each other to normally retain said hooks positioned for hooking engagement with said pocket, and ears extending from said rods through the opening of said shoe and adapted to be moved towards each other to impart movement to said rods and move the hooks out of a hooking position.

In testimony whereof I affix my signature.

JOEL KIRK WHITE. [L. S.]